US010421505B2

(12) United States Patent
Tjoelker et al.

(10) Patent No.: US 10,421,505 B2
(45) Date of Patent: Sep. 24, 2019

(54) ACTIVE DEFLECTOR SYSTEM FOR AN AUTOMOTIVE VEHICLE

(71) Applicant: GM GLOBAL TECHNOLOGY OPERATIONS LLC, Detroit, MI (US)

(72) Inventors: Rebecca Tjoelker, Commerce Charter Township, MI (US); Timothy D. Demetrio, Highland, MI (US); Caleb Potvin, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 119 days.

(21) Appl. No.: 15/665,752

(22) Filed: Aug. 1, 2017

(65) Prior Publication Data

US 2019/0039664 A1    Feb. 7, 2019

(51) Int. Cl.
*B62D 35/02* (2006.01)
*B62D 35/00* (2006.01)
*B62D 37/02* (2006.01)

(52) U.S. Cl.
CPC ........... *B62D 35/02* (2013.01); *B62D 35/005* (2013.01); *B62D 37/02* (2013.01)

(58) Field of Classification Search
CPC .............................. B62D 35/005; B62D 35/02
USPC ...................................................... 296/180.5
See application file for complete search history.

(56) References Cited

U.S. PATENT DOCUMENTS

| | | | | |
|---|---|---|---|---|
| 4,683,974 A * | 8/1987 | Richardson | ............. | B60Q 1/52 180/274 |
| 8,702,152 B1 * | 4/2014 | Platto | ................... | B62D 35/005 296/180.1 |
| 9,199,674 B2 * | 12/2015 | Wolf | ...................... | B60K 11/08 |
| 9,216,644 B2 * | 12/2015 | Cardile | ................. | B60H 1/241 |
| 9,561,827 B2 * | 2/2017 | Parry-Williams | ...... | B62D 37/02 |
| 9,714,057 B2 * | 7/2017 | Smith | .................. | B62D 35/008 |
| 2007/0063541 A1 * | 3/2007 | Browne | ................ | B62D 35/00 296/180.1 |
| 2007/0216194 A1 * | 9/2007 | Rober | .................. | B62D 35/007 296/180.1 |
| 2012/0330513 A1 * | 12/2012 | Charnesky | ............ | G01S 13/931 701/48 |
| 2017/0101137 A1 * | 4/2017 | Tesch | ..................... | B62D 35/02 |
| 2017/0137074 A1 * | 5/2017 | Miller | ................. | B62D 35/005 |
| 2017/0299006 A1 * | 10/2017 | Shi | ......................... | B62D 35/02 |
| 2018/0162460 A1 * | 6/2018 | Seidler | ................... | B62D 25/18 |
| 2018/0297647 A1 * | 10/2018 | Klop | ................... | B62D 35/005 |

* cited by examiner

*Primary Examiner* — Pinel E Romain

(57) ABSTRACT

An automotive vehicle according to the present disclosure includes a body having a lower surface with a plurality of vehicle wheels having respective contact surfaces for contacting a driving surface. An underbody space is thereby defined between the contact surfaces and the lower surface of the body. The vehicle additionally includes a movable air deflector coupled to the lower surface and projecting into the underbody space. The air deflector has a first position with a first blockage profile and a second position with a second blockage profile. The vehicle additionally includes an actuator coupled to the air deflector, which is configured to drive the air deflector between the first position and the second position. The vehicle further includes a controller configured to, in response to satisfaction of an operating condition, control the actuator to move the air deflector from the first position to the second position.

17 Claims, 3 Drawing Sheets

ACTIVE DEFLECTOR SYSTEM FOR AN AUTOMOTIVE VEHICLE

TECHNICAL FIELD

The present disclosure relates to automotive vehicles, and more particularly to aerodynamic features of automotive vehicles.

INTRODUCTION

Modern automotive vehicles typically have hydraulically actuated brakes on both the front and rear wheels of the vehicle. In vehicle disc brake systems, the hub of the vehicle wheel is mounted to an axially concentric, circular disc formed of a thermally conductive and wear resistant metal. A brake caliper, fixed to the vehicle, fits around a sector of the circular disc. When a vehicle operator steps on the brake pedal, hydraulic fluid is pressurized in a brake hose connected to the brake caliper and forces friction material pads of the brake caliper against both sides of the rotating wheel disc. The frictional engagement between the caliper pads and the rotating disc serves to slow, and possibly stop, the vehicle wheel. In drum brake systems, the vehicle wheel has an axially concentric, circular metal drum surface of thermally conductive and wear resistant metal. When braking is called for, pressurized hydraulic fluid in a brake hose forces arcuate brake linings of suitable friction material outwardly against the wheel drum, to again slow, and possibly stop, the vehicle wheel.

For styling, and to control the dispersion of sand, mud, liquids, and other road spray picked up by the rotating tire, vehicle wheels are generally partially enclosed within the vehicle body within a wheel well. The wheel well is a generally circular, partially closed cavity, open at its underside and at a vehicle fender or quarter panel and extending part-way into the vehicle body. Contained within the wheel well will be the wheel, brake assembly and, often, some suspension components such as springs and shock absorbers. The wheel well is sized to accommodate the wheel and tire in all configurations which they may adopt and so its design admits of the expected range of tire movements. These may include the suspension travel and, for the front wheels, the expected range of angular inclinations on turning the steering wheel. Commonly the wheel well will be generally closed at the vehicle interior and around an appreciable portion of the tire circumference.

Generally air flow around a moving vehicle contributes significantly to the cooling of brake disc and brake drum surfaces when they are heated by the repeated wheel braking actions of normal driving. This airflow is usually more than sufficient to cool brake discs, drums, and friction materials under most commonly-experienced driving conditions, although some extra operator care might be required when towing a trailer or when driving in mountainous regions with long, steep grades. However, vehicle hood, roof, rear deck, and side surfaces are being designed with greater emphasis on reducing vehicle drag. Some design features included for drag reduction, such as air dams, may also reduce the flow of air available for cooling frictionally heated brake member surfaces.

SUMMARY

An automotive vehicle according to the present disclosure includes a body having a lower surface. The vehicle additionally includes a plurality of vehicle wheels disposed at the lower surface. Each respective wheel has a respective contact surface for contacting a driving surface. An underbody space is thereby defined between the contact surfaces and the lower surface of the body. The vehicle additionally includes a movable air deflector coupled to the lower surface and projecting into the underbody space. The movable air deflector has a first position and a second position. The first position presents a first blockage profile in the underbody space and the second position presents a second blockage profile in the underbody space. The vehicle additionally includes an actuator coupled to the movable air deflector, which is configured to drive the movable air deflector between the first position and the second position. The vehicle further includes a controller. The controller is configured to, in response to satisfaction of an operating condition, control the actuator to move the movable air deflector from the first position to the second position.

In an exemplary embodiment, the movable air deflector additionally has an intermediate position between the first position and the second position, and the controller is further configured to, in response to satisfaction of a second operating condition, control the actuator to move the movable air deflector to the intermediate position.

In an exemplary embodiment, the vehicle additionally includes a vehicle brake assembly and a thermal sensor configured to detect a current temperature of the vehicle brake assembly. In such an embodiments the operating condition includes the current temperature exceeding a first predefined threshold. The controller may be further configured to control the actuator to move the movable member from the second position to the first position in response to the current temperature falling below a second predefined threshold. The second predefined threshold may be less than the first predefined threshold.

In an exemplary embodiment, the movable air deflector includes an elongate member having a first end and a second end, with the first end being coupled to the actuator. The actuator is configured to drive the elongate member in pivoting motion about a pivot axis passing through the first end. According to various embodiments, the pivot axis may be generally vertical or generally horizontal. The movable air deflector may include a second elongate member coupled to the actuator, with the actuator being further configured to drive the second elongate member in pivoting motion. The vehicle may include a second actuator and the movable air deflector may include a second elongate member coupled to the second actuator, with the second actuator being further configured to drive the second elongate member in pivoting motion.

A method of controlling a vehicle according to the present disclosure includes providing a vehicle. The vehicle has a body with an underbody space between a lower surface of the body and a driving surface. The method also includes providing a movable air deflector at the lower surface. The movable air deflector has a first position and a second position. The first position presents a first blockage profile in the underbody space and the second position presents a second blockage profile in the underbody space, which is distinct from the first blockage profile. The method also includes providing an actuator coupled to the movable air deflector and configured to drive the movable air deflector between the first position and the second position. The method further includes moving the movable air deflector, via the actuator, from the first position to the second position in response to satisfaction of an operating condition.

In an exemplary embodiment, the method further includes, in response to satisfaction of a second operating condition, moving the movable air deflector, via the actuator, to an intermediate position between the first position and the second position.

In an exemplary embodiment, the operating condition includes a current brake system temperature exceeding a first predefined threshold. In such embodiments, the method may further include, in response to the current brake system temperature subsequently falling below a second predefined threshold, moving the movable air deflector, via the actuator, from the second position to the first position. The second predefined threshold may be less than the first predefined threshold.

In an exemplary embodiment, the method further includes providing a controller in communication with the actuator, where the moving the movable air deflector via the actuator is performed automatically by the controller.

An air deflector system for an automotive vehicle according to the present disclosure includes a movable air deflector with an elongate member. The air deflector has a blocking position in which the elongate member is projected into an underbody space to inhibit air passage through the underbody space and a cooling position in which air is directed to a vehicle component. The air deflector system also includes an actuator coupled to the elongate member and configured to drive the elongate member between the blocking position and the cooling position. The air deflector system also includes a controller configured to, in response to satisfaction of an operating condition, control the actuator to move the elongate member from the blocking position to the cooling position.

In an exemplary embodiment, the elongate member has a first end and a second end, with the first end being coupled to the actuator, and the actuator is configured to drive the elongate member in pivoting motion about a pivot axis passing through the first end. The pivot axis may be generally horizontal. The operating condition may include a current temperature of the vehicle component exceeding a predefined threshold.

Embodiments according to the present disclosure provide a number of advantages. For example, the present disclosure provides a system and method for satisfying brake cooling requirements of a performance automotive vehicle while also reducing vehicle drag.

The above and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desirable for particular applications or implementations.

Figure 1:
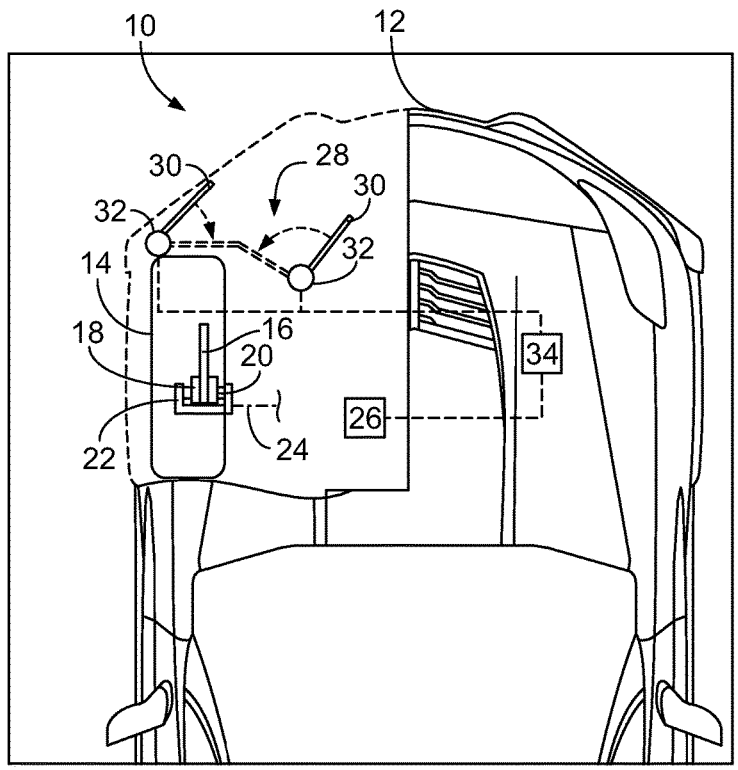
FIG. 1 is a top view of an automotive vehicle according to an embodiment of the present disclosure.
Figure 2:
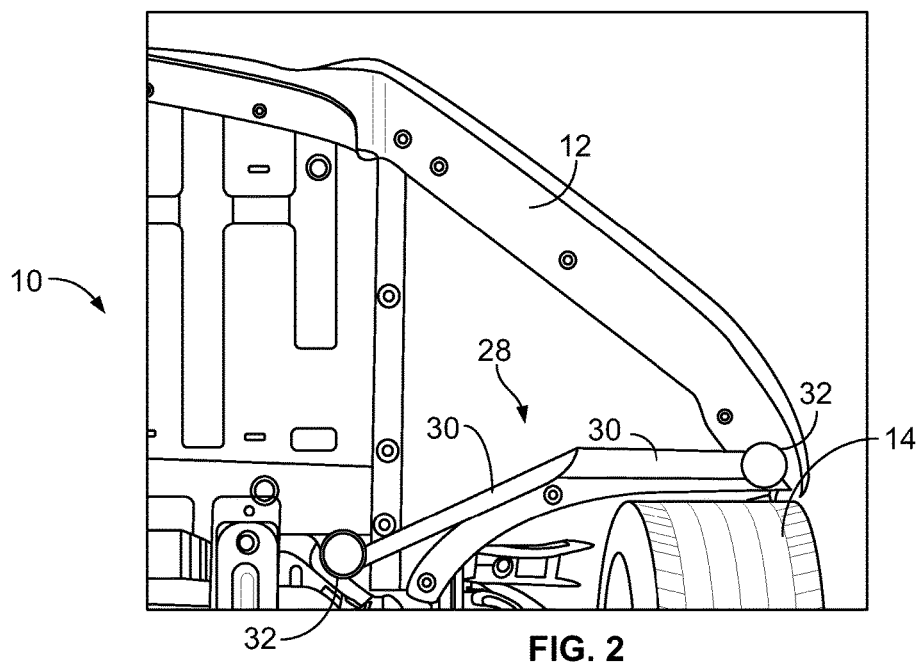
FIG. 2 is a bottom view of an automotive vehicle according to an embodiment of the present disclosure.

Referring now to FIGS. 1 and 2, a first embodiment of an automotive vehicle 10 according to the present disclosure is illustrated. The automotive vehicle 10 is provided with a body 12. At least one vehicle wheel 14 is disposed below the body 12. A disc rotor 16 is mounted generally concentrically with the wheel 14. A pair of brake pads 18 are configured to frictionally engage the rotor 16 to decelerate the vehicle. The brake pads 18 are carried by pistons 20, which are in turn slidably supported by a caliper 22. A fluid line 24 supplies fluid to the caliper 22, such that an increase in line pressure in the fluid line 24 causes actuation of the pistons 20 and, in turn, the brake pads 18. When frictionally engaged, the brake pads 18 and rotor 16 experience an increase in thermal energy.

A sensor 26 is configured to detect the temperature of the caliper 22. In an exemplary embodiment, the sensor 26 includes a thermal sensor configured to detect fluid temperature of fluid supplied by the fluid line 24. In other embodiments other sensors may be used, such as an infrared thermometer configured to detect temperature of the caliper 22. In an alternative embodiment, the sensor 26 is configured to detect a line pressure in the fluid line 24 and infer a temperature increase of the caliper 22 based on a drop in line pressure.

An active tire deflector 28 is disposed forward of the vehicle wheel 14. The active tire deflector 28 comprises at least one movable member 30 coupled to one or more actuators 32. In the embodiment illustrated in FIGS. 1 and 2, the active tire deflector 28 includes two movable members 30, each coupled to a respective actuator 32. The active tire deflector 28 has a cooling position, as illustrated in FIG. 1, and a blocking position, as illustrated in FIG. 2. The blocking position and cooling position present different underbody blockage profiles from one another.

In the cooling position, the active tire deflector 28 is arranged to direct air to the brake caliper 22 and thereby provide cooling. In the embodiment illustrated in FIG. 1, the movable members 30 are disposed generally parallel with one another to form a passage and thereby direct air to the brake caliper 22. The cooling position may be selected, for example, based on computational fluid dynamics (CFD) analysis or wind tunnel testing.

In the blocking position, the active tire deflector 28 is arranged to direct air around the vehicle wheel 14. In the embodiment illustrated in FIG. 2, the movable members 30 are disposed to generally abut one another and form a deflector foreword of the vehicle wheel 14. Air is thereby directed around the vehicle wheel 14, decreasing drag. As with the cooling position, the blocking position may be selected, for example, based on CFD analysis or wind tunnel testing.

The actuator or actuators 32 are configured to move the active tire deflector 28 between the blocking position and the cooling position. In the embodiment illustrated in FIGS. 1 and 2, the actuators 32 are configured to pivot the movable members 30 between the positions about generally vertical pivot axes, as illustrated by the arrows in FIG. 1. The actuators 32 may include electro-mechanical actuation units such as solenoids, or any other appropriate actuation unit. The free ends of the movable members 30, i.e. the ends not coupled to the actuators 32, may swing freely or be carried by a track, according to various embodiments.

In some embodiments, the actuators 32 may be controlled to progressively vary the position of the movable members 30 among a plurality of intermediate positions between the blocking position and the cooling position, to thereby more gradually increase cooling as needed while maintaining the deflector effect for drag reduction.

In the embodiment illustrated in FIGS. 1 and 2, one active tire deflector 28 is associated with a front driver-side wheel well. Other similar deflectors, not illustrated, may be associated with one or more of the other vehicle wheels. It will be appreciated that in some vehicles, it may be appropriate to employ individual deflectors for each wheel while in other vehicles a single deflector may provide blocking and cooling functions to multiple wheels.

The sensor 26 and actuators 32 are in communication with or under the control of a controller 34. The controller 34 is programmed to control the actuators 32 to move the active tire deflector 28 base at least in part on readings from the sensor 26, as will be discussed in further detail below with respect to FIG. 3.

While depicted as a single unit, the controller 34 may include one or more controllers collectively referred to as a "controller." The controller 34 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

Figure 3:
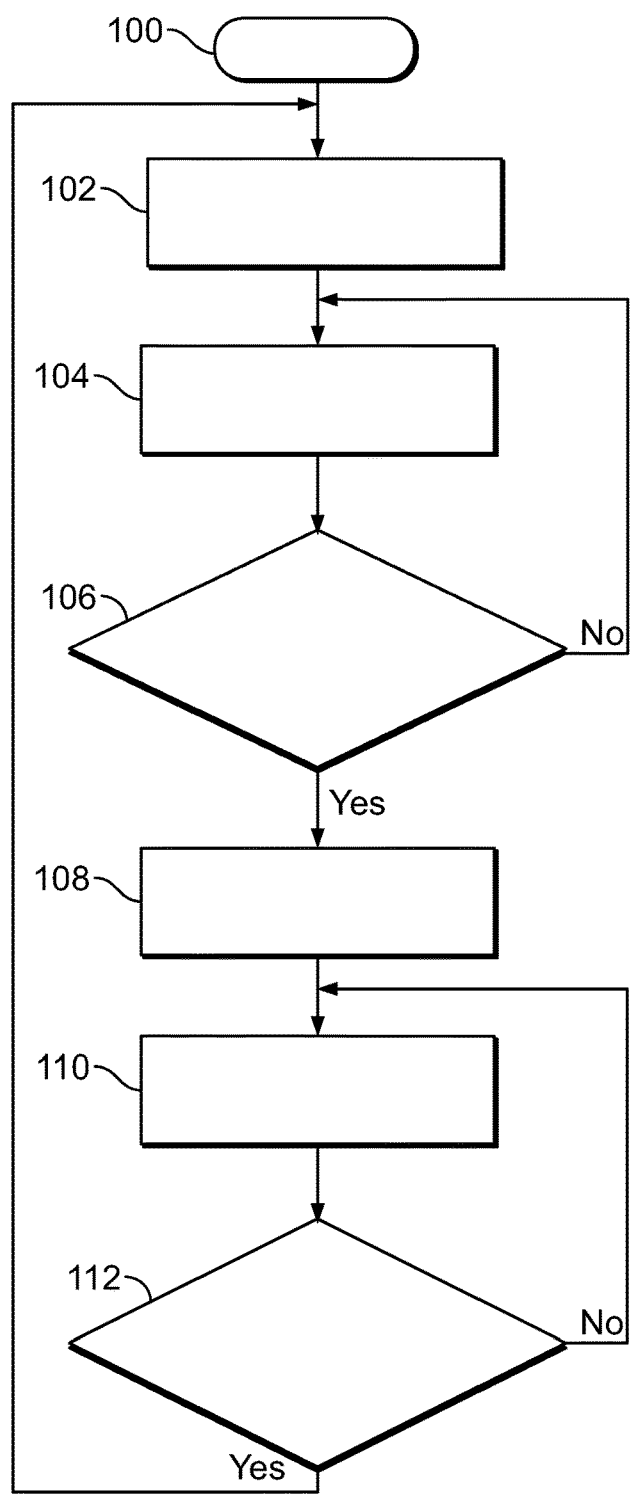
FIG. 3 is a flowchart representation of a method of controlling an automotive vehicle according to an embodiment of the present disclosure.

Referring now to FIG. 3, a method of controlling a duct system according to the present disclosure is illustrated in flow chart form. The method begins at block 100. In an exemplary embodiment, the method is performed by means of programming provided to a controller, e.g. the controller 34 illustrated in FIG. 1.

The air deflector is controlled to the blocking position, as illustrated at block 102. As discussed above, in the blocking position, air deflector is arranged to direct air around one or more vehicle wheels, thereby reducing vehicle drag and increasing fuel economy.

A brake caliper temperature is detected, as illustrated at block 104. This may be performed, for example, by means of the sensor 26 illustrated in FIG. 1.

A determination is made of whether the brake caliper temperature exceeds a first predefined threshold, as illustrated at operation 106. The first predefined threshold is based on a desired operating temperature range for the brake system and may be, for example, on the order of 1,000 degrees Fahrenheit.

If the determination of operation 106 is negative, i.e. the detected caliper temperature does not exceed the first threshold, then control returns to block 104. The air deflector is thereby maintained in the blocking position unless and until a detected brake caliper temperature exceeds the first threshold.

If the determination of operation 106 is positive, i.e. the detected caliper temperature does exceed the first threshold, then the air deflector is controlled to the cooling position, as illustrated at block 108. As discussed above, in the cooling position, the air deflector is arranged to direct air to one or more brake systems associated with vehicle wheels and thereby provide cooling.

The brake caliper temperature is detected, as illustrated at block 110. As discussed above, this may be performed by means of the sensor 26 illustrated in FIG. 1.

A determination is made of whether the brake caliper temperature falls below a second predefined threshold, as illustrated at operation 112. The second predefined threshold may be equal to or different from the first predefined threshold. In an exemplary embodiment, the second predefined threshold is less than the first predefined threshold, to thereby avoid rapid cycling between the cooling and blocking modes due to hysteresis.

If the determination of operation 112 is negative, i.e. the detected caliper temperature does not fall below the second threshold, control returns to block 110. The air deflector is thereby maintained in the cooling position unless and until the detected brake caliper temperature falls below the second threshold.

If the determination of operation 112 is positive, i.e. the detected caliper temperature does fall below the second threshold, then control returns to block 102 and the air deflector is controlled to the blocking position.

Variations on the above are also contemplated within the scope of the present disclosure.

Figure 4A:
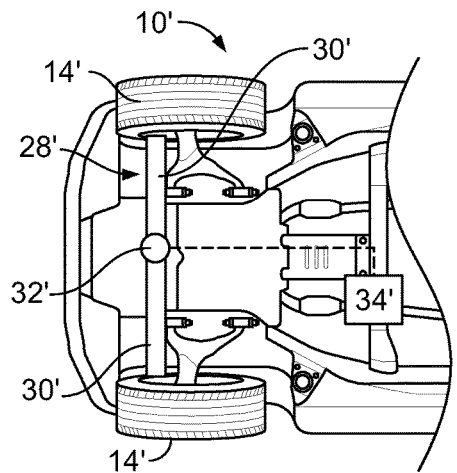
FIGS. 4A and 4B are schematic representations of a vehicle according to an embodiment of the present disclosure.
Figure 4B:
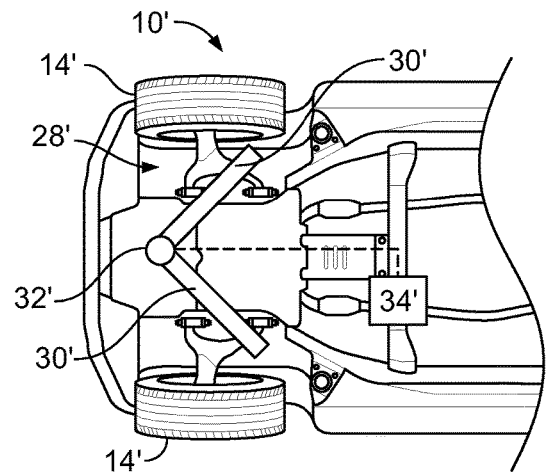

Referring now to FIGS. 4A and 4B, a second exemplary embodiment according to the present disclosure is illustrated. In the embodiment of FIGS. 4A and 4B, a vehicle 10' is provided with an air deflector 28' coupled to an actuator 32'. The air deflector 28' includes first and second movable members 30'. The actuator 32' is configured to pivot the first and second movable members 30' about a generally vertical pivot axis. The actuator 32' is under the control of a controller 34'. The controller is configured to control the actuator 32' to move the air deflector 28' between a blocking position, as illustrated in FIG. 4A, and a cooling position, as illustrated in FIG. 4B, e.g. according to an algorithm similar to that illustrated in FIG. 3. In the blocking position, the air deflector 28' functions as an air dam, inhibiting the passage of air under the vehicle 10' and thereby decreasing drag. In the cooling position, the movable members 30' are pivoted to present a different blockage pattern, deflecting air toward vehicle wheels 14' to thereby increase cooling of vehicle brakes.

Figure 5A:
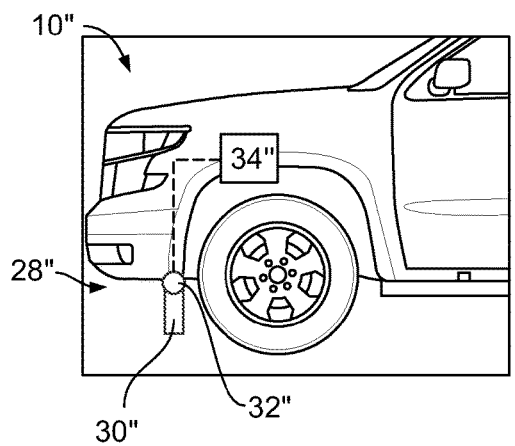
FIGS. 5A and 5B are schematic representations of a vehicle according to an embodiment of the present disclosure.
Figure 5B:
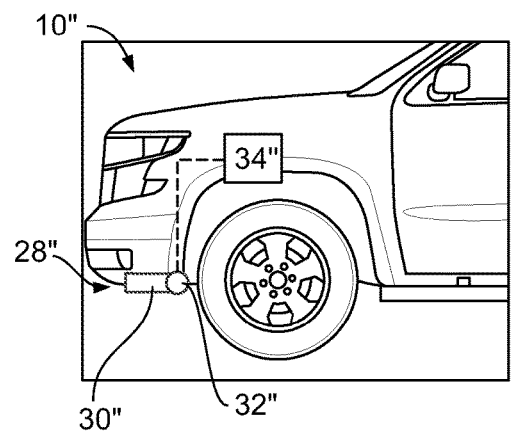

Referring now to FIGS. 5A and 5B, a third exemplary embodiment according to the present disclosure is illustrated. In the embodiment of FIGS. 5A and 5B, a vehicle 10" is provided with an air deflector 28" coupled to an actuator 32". The air deflector 28" includes a movable member 30". The actuator 32" is configured to pivot the movable member 30" about a generally horizontal pivot axis extending laterally across the vehicle. The actuator 32" is under the control of a controller 34". The controller is configured to control the actuator 32" to move the air deflector 28" between a blocking position, as illustrated in FIG. 5A, and a cooling position, as illustrated in FIG. 5B, e.g. according to an algorithm similar to that illustrated in FIG. 3. In the blocking position, the air deflector 28" functions as an air dam, inhibiting the passage of air under the vehicle 10" and thereby decreasing drag. In the cooling position, the movable members 30" are pivoted to present a different blockage pattern, deflecting air toward vehicle wheels 14" to thereby increase cooling of vehicle brakes.

As will be appreciated by one of ordinary skill in the art, similar air deflector systems may be used to selectively provide cooling to other components in an automotive vehicle as needed.

As may be seen, the present disclosure provides a system and method for balancing drag reduction and brake cooling requirements for a performance automotive vehicle.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle comprising:
a body having a lower surface;
a plurality of vehicle wheels disposed at the lower surface, each respective wheel of the plurality of wheels having a respective contact surface for contacting a driving surface, an underbody space being defined between the contact surfaces and the lower surface of the body;
a movable air deflector coupled to the lower surface and projecting into the underbody space, the movable air deflector having a first position and a second position, the first position presenting a first blockage profile in the underbody space and the second position presenting a second blockage profile in the underbody space, distinct from the first blockage profile;
an actuator coupled to the movable air deflector and configured to drive the movable air deflector between the first position and the second position, wherein the movable air deflector includes an elongate member having a first end and a second end, the first end being coupled to the actuator, and wherein the actuator is configured to drive the elongate member in pivoting motion about a pivot axis passing through the first end;
a second actuator, wherein the movable air deflector includes a second elongate member coupled to the second actuator, and wherein the second actuator is further configured to drive the second elongate member in pivoting motion; and
a controller configured to, in response to satisfaction of an operating condition, control the actuator to move the movable air deflector from the first position to the second position.

2. The automotive vehicle of claim 1, wherein the movable air deflector additionally has an intermediate position between the first position and the second position, and wherein the controller is further configured to, in response to satisfaction of a second operating condition, control the actuator to move the movable air deflector to the intermediate position.

3. The automotive vehicle of claim 1, further comprising a vehicle brake assembly and a thermal sensor configured to detect a current temperature of the vehicle brake assembly, wherein the operating condition includes the current temperature exceeding a first predefined threshold.

4. The automotive vehicle of claim 3, wherein the controller is further configured to control the actuator to move the movable air deflector from the second position to the first position in response to the current temperature falling below a second predefined threshold.

5. The automotive vehicle of claim 4, wherein the second predefined threshold is less than the first predefined threshold.

6. The automotive vehicle of claim 1, wherein the pivot axis is generally vertical.

7. The automotive vehicle of claim 1, wherein the pivot axis is generally horizontal.

8. The automotive vehicle of claim 1, wherein the movable air deflector includes a second elongate member coupled to the actuator, and wherein the actuator is further configured to drive the second elongate member in pivoting motion.

9. A method of controlling a vehicle, the method comprising:
providing a vehicle having a body with an underbody space between a lower surface of the body and a driving surface;
providing a movable air deflector at the lower surface, wherein the movable air deflector includes an elongate member having a first end and a second end, wherein the movable air deflector includes a second elongate member, the movable air deflector having a first position and a second position, the first position presenting a first blockage profile in the underbody space and the second position presenting a second blockage profile in the underbody space, distinct from the first blockage profile;
providing an actuator coupled to the first end of the movable air deflector and configured to drive the movable air deflector between the first position and the second position, the actuator being configured to drive the elongate member in pivoting motion about a pivot axis passing through the first end;
providing a second actuator, the second elongate member being coupled to the second actuator, the second actuator being configured to drive the second elongate member in pivoting motion; and
in response to satisfaction of an operating condition, moving the movable air deflector, via the actuator, from the first position to the second position.

10. The method of claim 9, further comprising, in response to satisfaction of a second operating condition, moving the movable air deflector, via the actuator, to an intermediate position between the first position and the second position.

11. The method of claim 9, wherein the operating condition includes a current brake system temperature exceeding a first predefined threshold.

12. The method of claim 11, further comprising, in response to the current brake system temperature subsequently falling below a second predefined threshold, moving the movable air deflector, via the actuator, from the second position to the first position.

13. The method of claim 12, wherein the second predefined threshold is less than the first predefined threshold.

14. The method of claim 9, further comprising providing a controller in communication with the actuator, wherein the moving the movable air deflector via the actuator is performed automatically by the controller.

15. An air deflector system for an automotive vehicle, comprising:
- a movable air deflector comprising an elongate member, the air deflector having a blocking position in which the elongate member is projected into an underbody space to inhibit air passage through the underbody space and a cooling position in which air is directed to a vehicle component, the elongate member having a first end and a second end, the movable air deflector including a second elongate member;
- an actuator coupled to the first end of the elongate member and configured to drive the elongate member between the blocking position and the cooling position, the actuator being configured to drive the elongate member in pivoting motion about a pivot axis passing through the first end;
- a second actuator, the second elongate member being coupled to the second actuator, wherein the second actuator is configured to drive the second elongate member in pivoting motion; and
- a controller configured to, in response to satisfaction of an operating condition, control the actuator to move the elongate member from the blocking position to the cooling position.

16. The air deflector system of claim 15, wherein the pivot axis is generally horizontal.

17. The air deflector system of claim 16, wherein the operating condition includes a current temperature of the vehicle component exceeding a predefined threshold.

* * * * *